Dec. 7, 1965        R. J. GLEASON ETAL        3,221,960
CAR TOP CARRIER
Filed March 11, 1964        2 Sheets-Sheet 2
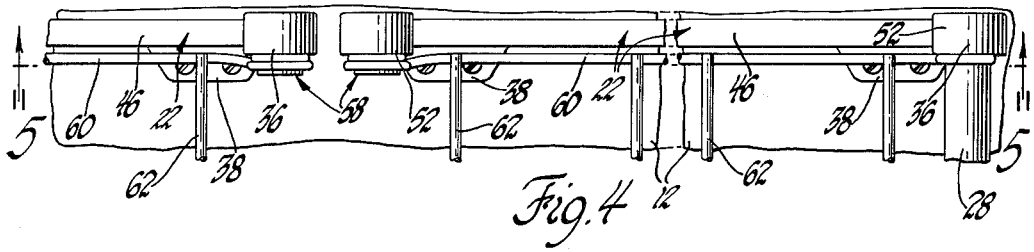
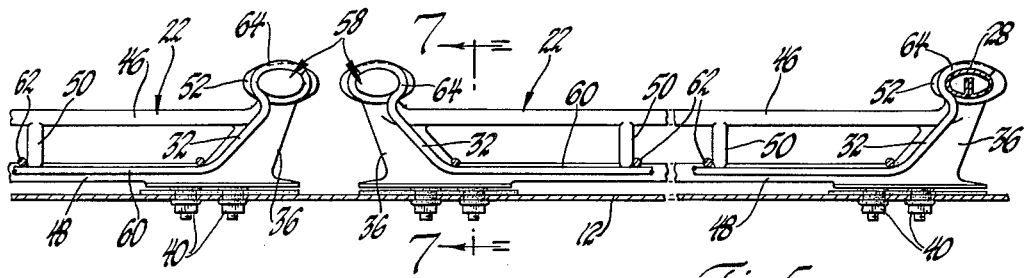
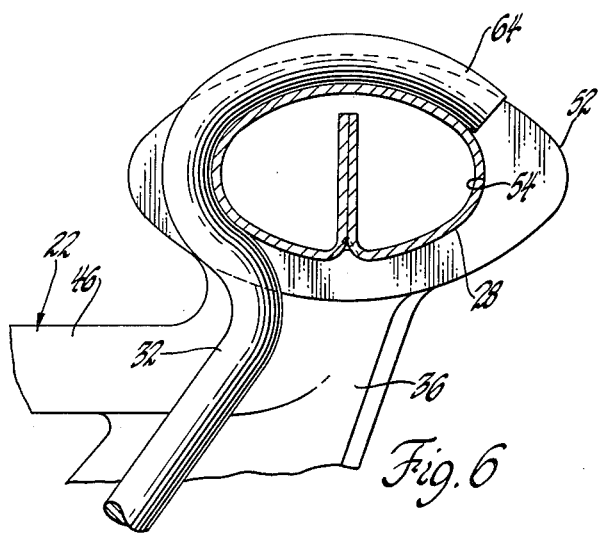
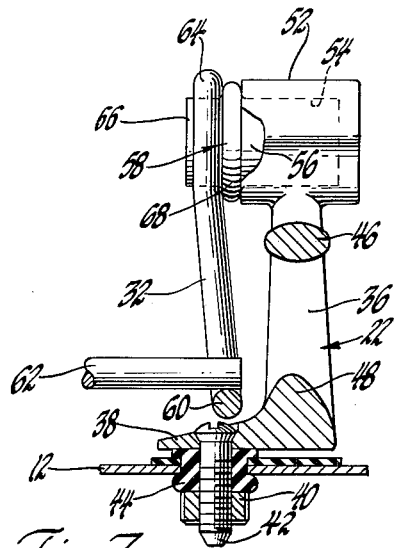
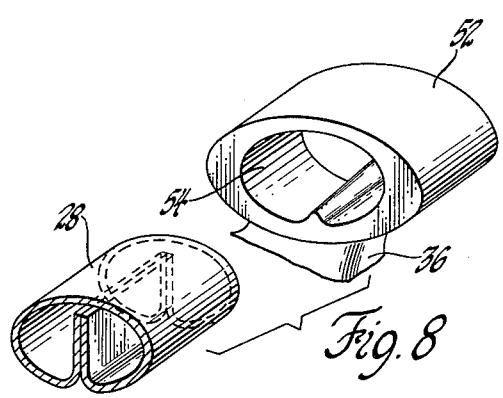
INVENTORS
Richard J. Gleason,
Clyde W. Morris &
BY  LaVerne B. Ragsdale
Herbert Furman
ATTORNEY United States Patent Office 3,221,960
Patented Dec. 7, 1965

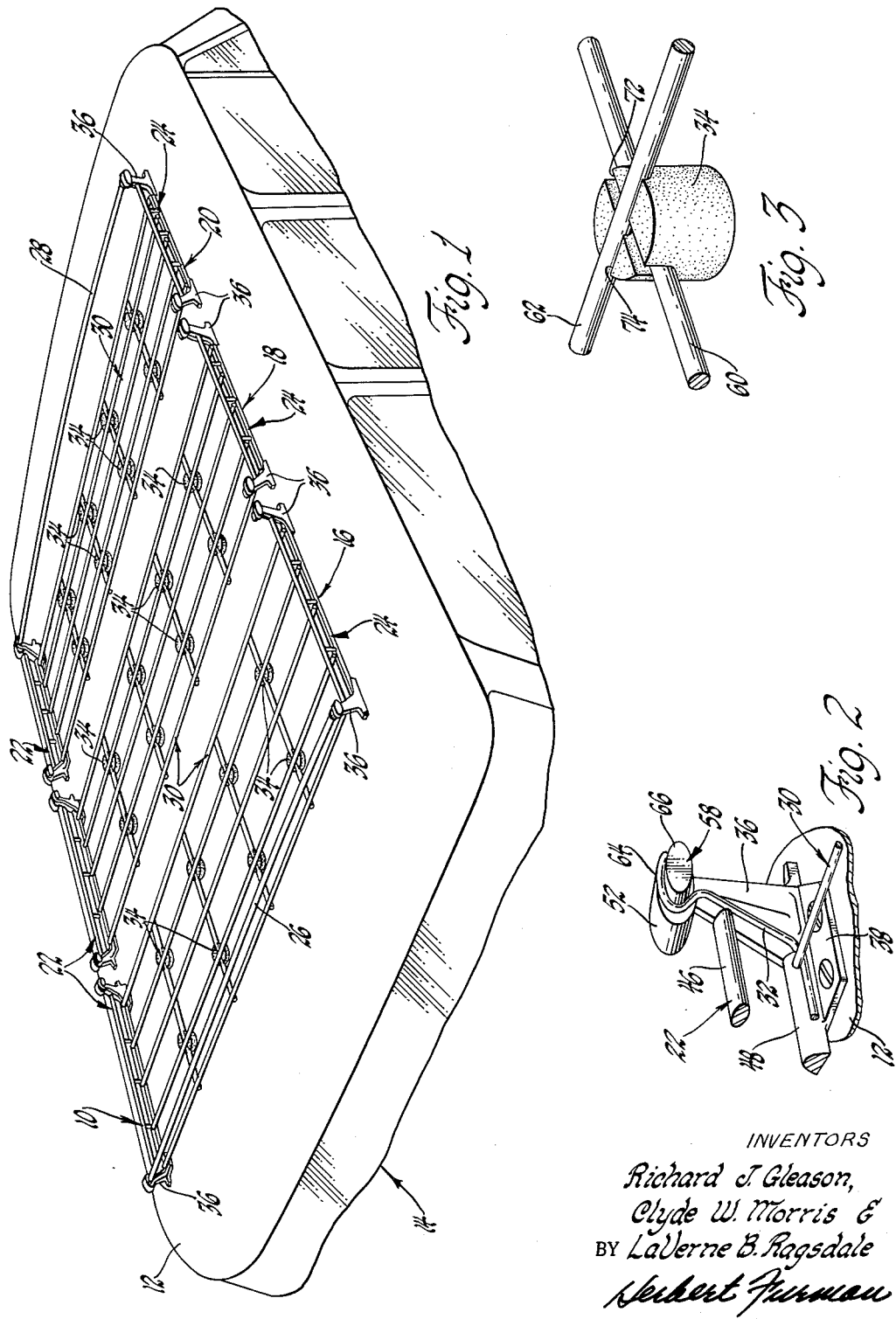

3,221,960
CAR TOP CARRIER
Richard J. Gleason, Warren, Clyde W. Morris, Livonia, and La Verne B. Ragsdale, Birmingham, Mich., assignors to General Motors Corporation, Detroit, Mich., a corporation of Delaware
Filed Mar. 11, 1964, Ser. No. 351,020
5 Claims. (Cl. 224—42.1)

This invention relates to car top carriers and more particularly to luggage racks for automotive vehicles.

At the present time most luggage racks are usually made to fit a certain make and model of automotive vehicle, such as station wagons, since the demand for such racks is usually restricted to only a few types of vehicle.

This invention provides a luggage rack which can easily be fitted to all makes and models of automotive vehicles and, further, which can be made in units or modules such that a number of units can be used together wherever desired to make up a larger assembly.

One feature of this invention is that the various parts of the luggage rack interfit with each other so as to be easily assembled or disassembled without the use of special tools.

Another feature of this invention is that the parts are interchangeable as to hand and that the various parts can be assembled in different manners to provide the desired luggage rack or assembly.

A further feature of this invention is that the luggage rack includes spaced side rails which are adapted to be mounted on the supporting body panel and are interconnected by a wire basket structure which supports the luggage or other material to be carried, with the side rails being adapted to be interconnected by cross bars if desired.

These and other features of this invention will be readily apparent from the following specification and drawings wherein:

FIGURE 1 is a perspective view of a carrier rack assembly according to this invention mounted on the top of an automotive vehicle;

FIGURE 2 is an enlarged view of a portion of FIGURE 1;

FIGURE 3 is an enlarged view of a portion of FIGURE 1;

FIGURE 4 is a top plan view of a portion of the carrier rack assembly of FIGURE 1;

FIGURE 5 is a view taken generally along the plane indicated by line 5—5 of FIGURE 4;

FIGURE 6 is an enlarged view of a portion of FIGURE 5;

FIGURE 7 is a view taken along the plane indicated by line 7—7 of FIGURE 5; and

FIGURE 8 is an exploded perspective view.

A carrier rack assembly 10 is shown in FIGURE 1 as mounted on the roof panel 12 of an automotive vehicle 14. It is made up of three racks which are identified 16, 18 and 20.

Each of the carrier racks includes a pair of like interchangeable side rails 22 and 24.

The carrier racks 16 and 20 are provided with like cross bars 26 and 28 which extend between the side rails of these racks and serve as end rails or walls.

Wire-rod baskets 30 extend between the side rails 22 and 24 of each rack and are secured thereto by hangers 32 provided at each corner. In addition, cushion supports 34 space and support the baskets on the vehicle roof 12.

Each side rail includes posts 36 at each end thereof. A flange 38 forms the base for the post and extends to one side thereof, FIGURE 7. The threading of a nut 40 on a screw 42 distorts a flanged rubber bushing 44 laterally of an opening in the roof panel 12 to releasably secure the post in place.

Upper and lower disposed side rail bars 46 and 48 extend between the posts 36 of each side rail, in parallel spaced relation, and are connected by uprights or cross bars 50 to provide a wall-like structure.

The posts 36 each include a head 52 which is elliptical in cross section and has an elliptical and inverted heart-shaped tapered recess 54 opening to one side thereof.

The recesses 54 receive the ends of the tubular cross bars 26 and 28 which have a cross section complementary in shape to the openings of the recesses 54. Since the recesses 54 are slightly tapered, the ends of the cross bars are squeezed to a smaller size when inserted in the recesses to provide a tight rattle-free fit.

Only the end posts 36 of the racks 16 and 20 use the cross bars 26 and 28, and the recesses 54 of the other posts 36 receive complementary shaped plugs or portions 56 of mounting members 58 to mount these members on the racks.

The wire rod baskets 30 are made of transversely disposed rods 60 and 62 which form a lattice work, with the outer or terminal rods 60 being formed to include the hangers 32.

The hangers 32 extend upwardly and outwardly of each basket and the hook portions 64 thereof are readily flexed so as to be hooked over the cross rails 26 and 28 and the portions 66 of the members 58.

The portions 56 and 66 of the members 58 are separated by an annular collar or flange 68 which is adapted to engage the heads 52 of the posts adjacent the openings of the recesses when the portions 56 are inserted therein. The distance between opposite pairs of flanges 68 is less than the normal distance between the opposite pairs of hangers 32 so that when the hangers are hooked over the members 58, they bias the members 58 oppositely of each other to thereby retain the portions 56 of these members within the recesses 54.

The cushion supports 34 are of a resilient material and include intersecting passages 72 and 74 which open upwardly and respectively receive rods 60 and 62 at the junctures thereof.

It should be obvious that one pair of side rails 24 and one pair of cross bars 26 or 28 would provide a unit rack for use with deck lids or the like. Similarly, two unit racks 16 and 20 might serve for regular car tops and three unit carrier racks, as shown, for station wagons.

It should also be apparent that the side rails 24, baskets 30 and cross rails 26 and 28 might be made in various sizes to provide various size carrier racks.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims are to be considered as inclusive thereunder.

We claim:
1. A car top type carrier rack, comprising: interchangeable side rail members including means of attachment to a vehicle body panel in parallel spaced and tandem relation, cross rail members secured between the terminal ends of said side rail members, and a wire rod basket member received and supported between said side rail members, said basket member including a load carrying bottom wall having hanger hooks provided at the corners thereof and engaging the ends of said side and cross rail member, cushion supports provided under said basket bottom wall, and said hanger hooks being outwardly open and received in spring tensioned engagement between the ends of said side rail members.

2. A carrier rack for car top use, and comprising: two pairs of side rail members having the members of each pair disposed in parallel spaced relation and the pairs in tandem, said side rail members being interchangeable and each having means for attachment to a vehicle body panel provided at the ends thereof, cross rail members received in engagement with the upper disposed ends of the most forwardly and rearwardly disposed ends of said side rail members, a wire rod basket member including only a load carrying bottom wall received between each pair of said side rail members, said basket members including outwardly open hanger hooks at the corners thereof received in tensioned engagement with said cross rail members at one end and the inner disposed ends of said side rail members at the other ends thereof, and cushion supports provided at spaced intervals under the bottom walls of said baskets for intermediate support on the vehicle body panel over which provided.

3. A car top carrier comprising: a pair of spaced side rail members, each member including spaced posts provided with a recess, the recesses of said spaced posts being arranged in oppositely facing pairs, means for mounting said side rail members on a panel of a vehicle body, means adapted to be releasably received within the recesses of said side rail members and extending outwardly therefrom toward the opposite side rail member, basket means adapted to extend between said side rail members, means on said basket means adapted to be releasably connected to said extending means, and means for supporting said basket means on said panel intermediate said side rail members.

4. A car top carrier comprising: a pair of spaced side rail members, each member including spaced posts provided with a recess, the recesses of said spaced posts being arranged in oppositely facing pairs, means for mounting said side rail members on a panel of a vehicle body, hanger support means releasably received within the recesses of said spaced posts, basket means located between said side rail members, and hanger means on said basket means releasably connected to said hanger support means to mount said basket means on said side rail members.

5. The structure recited in claim 4 wherein said basket means includes longitudinally and laterally spaced wire members secured together at their intersections, and means secured to said wire members at said intersections for supporting said basket means on said panel intermediate said side rail members.

References Cited by the Examiner

UNITED STATES PATENTS

| 2,594,319 | 4/1952 | Law. |
| 2,645,391 | 7/1953 | Lecann-Deschamps. |
| 3,120,914 | 2/1964 | Smith. |

FOREIGN PATENTS

| 75,894 | 3/1953 | Denmark. |
| 61,213 | 10/1954 | France. |
| 833,749 | 7/1938 | France. |

GERALD M. FORLENZA, *Primary Examiner.*

HUGO O. SCHULZ, *Examiner.*